United States Patent [19]

Emori

[11] Patent Number: 5,259,474
[45] Date of Patent: Nov. 9, 1993

[54] STEERING FORCE CONTROL APPARATUS FOR POWER STEERING SYSTEM

[75] Inventor: Yasuyoshi Emori, Saitama, Japan

[73] Assignee: Jidosha Kiki Co., Ltd., Tokyo, Japan

[21] Appl. No.: 830,935

[22] Filed: Feb. 4, 1992

[30] Foreign Application Priority Data

Feb. 5, 1991 [JP] Japan .................................. 3-35370

[51] Int. Cl.$^5$ .............................................. B62D 5/06
[52] U.S. Cl. .................................. 180/132; 137/116.3
[58] Field of Search ............... 180/143, 142, 141, 132; 137/116.3

[56] References Cited

U.S. PATENT DOCUMENTS 3,774,629 11/1973 Enomoto ......................... 137/116.3

FOREIGN PATENT DOCUMENTS 68467 3/1988 Japan .

Primary Examiner—David M. Mitchell
Assistant Examiner—Andrew C. Pike
Attorney, Agent, or Firm—Flynn, Thiel, Boutell & Tanis

[57] ABSTRACT

A hydraulic pressure acting in a hydraulic reaction chamber of a power steering system is controlled. A spool valve is formed with portions having a greater and a smaller diameter, which portions are partly situated in an annular groove formed in a valve opening and communicating with the hydraulic reaction chamber. A spring is disposed to one side of the spool valve nearer the portion of a greater diameter to urge it toward the portion of a smaller diameter. Toward the portion of a smaller diameter, the spool valve abuts against a rod of a solenoid. The hydraulic pressure from a pump is introduced into the annular groove through a variable throttle formed in the portion of a greater diameter while the hydraulic pressure in the annular groove is returned to a tank through a variable throttle formed in the portion of a smaller diameter. As the hydraulic pressure in the annular groove rises, the spool valve is shifted in accordance with a difference in the pressure responsive areas, thus suppressing an increase in the reaction pressure.

6 Claims, 4 Drawing Sheets

STEERING FORCE CONTROL APPARATUS FOR POWER STEERING SYSTEM

BACKGROUND OF THE INVENTION

The invention relates to a steering force control apparatus for a power steering system and, in particular, to a reaction control valve unit which controls a hydraulic pressure acting upon a hydraulic reaction mechanism thereof.

A conventional steering force control apparatus for a power steering system is disclosed in Japanese Laid-Open Patent Application No. 68,467/1988 in which a torsion bar is twisted in accordance with an input applied to a steering wheel to switch a servo valve to introduce a hydraulic pressure into one of the chambers on one of the sides of a piston of a power cylinder, thereby imparting a steering assisting force to steerable road wheels. At the same time, to allow a driver of a vehicle to sense a resistance to a steering operation, there is provided a hydraulic reaction mechanism to develop a reaction or a force resulting from a steering operation which comprises a reaction to the twisting of the torsion bar, and a reaction component produced by a hydraulic reaction chamber which is acted upon by pressurized oil, as well as a reaction pressure control valve which controls the reaction to be introduced into the hydraulic reaction chamber.

In such a power steering system of the vehicle speed responsive type and utilizing a hydraulic reaction, the steering force generally comprises two components, namely, (1) a steering force component which results from a hydraulic reaction which is linearly proportional to the cylinder pressure, and (2) another component produced by the torsion bar in proportion to the square root of the cylinder pressure. The first component is generally controlled in a variable manner so as to correspond to the vehicle speed, by utilizing the reaction pressure control valve.

In the steering force control apparatus disclosed in Japanese Laid-Open Patent Application No. 68,467/1988 cited above, the steering force which is produced by the reaction of the hydraulic pressure exhibits a response which is linearly proportional to the cylinder pressure, so that the steering force increases in linear proportion to a load upon the power steering system under a high lateral G condition when running at high speeds, which is sometimes less desirable for the performance of the power steering system.

SUMMARY OF THE INVENTION

Therefore, it is an object of the invention to provide a steering force control apparatus for a power steering system which allows the characteristic of a hydraulic pressure reaction, which is linearly proportional to the cylinder pressure, to be varied in correspondence to a vehicle speed as in a conventional arrangement and which allows such characteristic to be variably controlled depending upon a load upon the power steering system.

DESCRIPTION OF EMBODIMENTS

Figure 1:
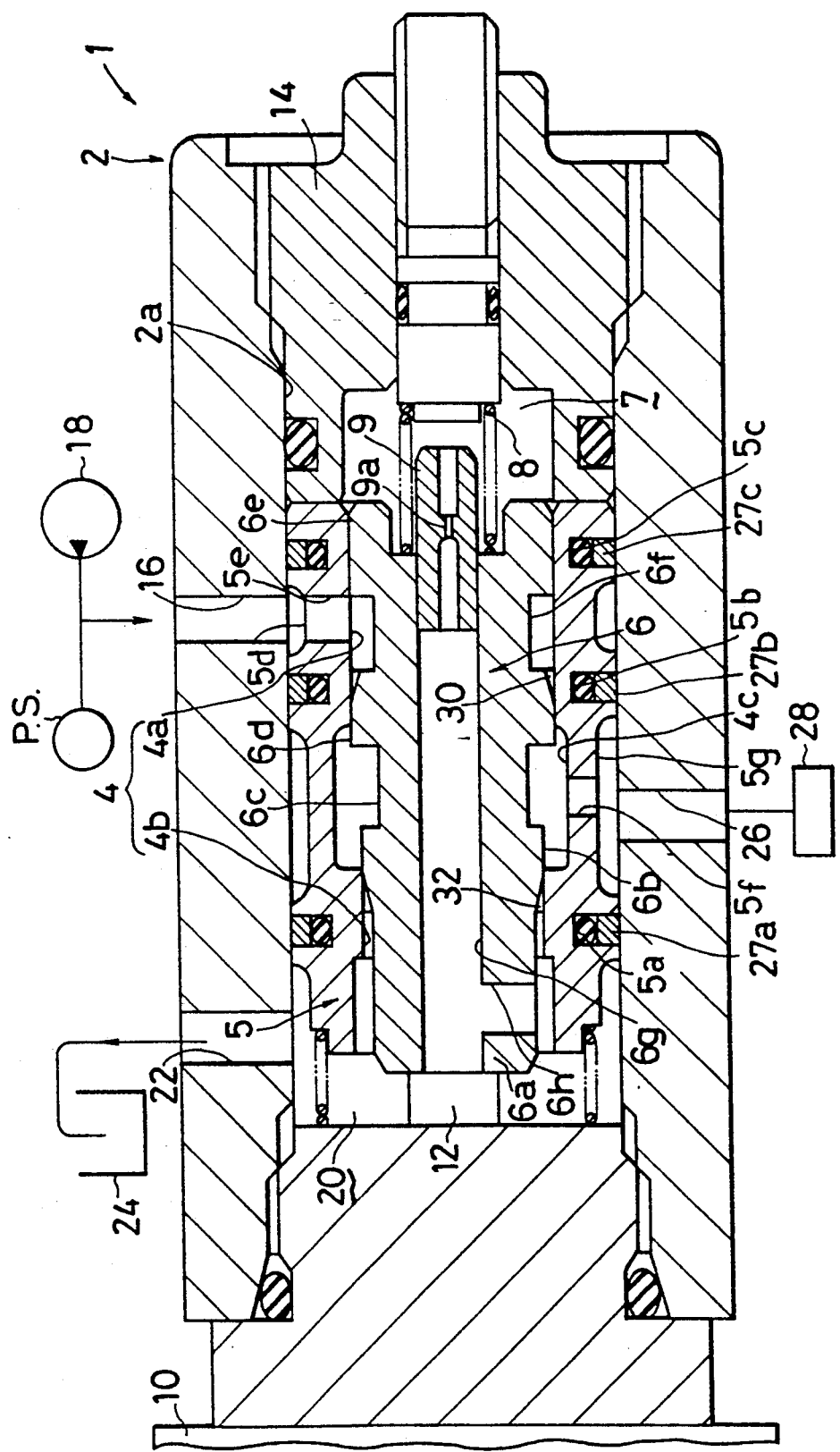
FIG. 1 is a longitudinal section of a steering force control apparatus for a power steering system according to one embodiment of the invention.

The invention will now be described with reference to several embodiments thereof shown in the drawings. FIG. 1 shows a steering force control apparatus for a power steering system according to one embodiment of the invention. A reaction control valve unit 1 includes a housing 2 having a central bore 2a therethrough and in which a sleeve 5 is fitted and is axially positionable by varying the distance that a plug 14 is threadedly received in one of the end openings of the bore 2a. A supply passage 16, a reaction passage 26, and a discharge passage 22 are formed to extend radially through the housing 2, and the outer peripheral surface of the sleeve 5 is formed with sealing grooves 5a, 5b and 5c, in which seal members 27a, 27b and 27c, respectively, are disposed to seal around the respective passages 16, 26 and 22. The sleeve 5 is internally formed with a valve opening 4, including an opening 4a of a greater diameter and an opening 4b of a smaller diameter with an annular groove 4c formed therebetween. A spool valve 6 is fitted in the valve opening 4, and is urged into a liquid chamber 20 formed at one end of the sleeve 5 by a spring 8 disposed in a liquid chamber 7 formed at the other end of the sleeve 5 at a location nearer the larger diameter opening 4a. A solenoid 10 is secured in the other opening of the housing 2 located nearer the smaller diameter opening 4b. A shank 6a is formed on the free end of the spool valve 6, and as it is urged by the spring 8, the shank 6a is disposed in abutment against the free end of a rod 12 which is adapted to be driven back and forth by the electromagnetic force of the solenoid 10.

The spool valve 6 has a small diameter land 6b adjacent the shank 6a, a pair of larger diameter lands 6d and 6e adjacent the other end, and an annular groove 6f disposed between the both lands 6d and 6e. The pair of lands 6d and 6e slidably fit in the larger diameter valve opening 4a while the land 6b slidably fits in the smaller diameter valve opening 4b. The provision of the annular groove 6c located between the lands 6b and 6d is not essential, but is provided for the convenience of machining. The liquid chamber 20 adjacent the shank 6a, is connected to the liquid chamber 7 in which the spring 8 is disposed through a radial opening 6h and an axially extending communication opening 6g, both formed in the spool valve 6, and an oscillation suppressing throttle opening 9a formed in a spool stop 9 which is forced fit into an end of the openings 6g adjacent the plug 14 so as to be integral with the spool valve 6.

Discharge oil from an oil pump 18 is introduced through the supply passage 16 into the annular groove 5d around the sleeve 5 and the radial passage 5e therein and the annular groove 6f located between the lands 6d and 6e in accordance with a load, which is branched from a passage leading to a power steering system (P.S.). The liquid chamber 20 adjacent the solenoid 10 communicates with a tank 24 through the discharge passage 22. The annular groove 4c formed in the inner surface of the valve opening 4 is connected to a hydraulic reaction chamber 28 through the radial passage 5f of the sleeve 5, an annular groove 5g around its periphery and the reaction passage 26.

The larger diameter land 6d of the spool valve 6 is formed with a first variable throttle 30 at a location toward the annular groove 6f while the smaller diameter land 6b is formed with a second variable throttle 32 at a location toward the shank 6a. Accordingly, the pressurized oil which is branched from the oil pump 18 and which is developed in accordance with a load upon the power steering system passes through the supply passage 16, the annular groove 5d, the radial passage 5e, the annular groove 6f, the variable orifice 30, the annular groove 4c in the inner surface of the valve opening 4, the second variable orifice 32, the liquid chamber 20 located adjacent the solenoid 10, the discharge passage 22 and thence to the tank 24. A hydraulic pressure which is developed between the variable orifices 30 and 32 is introduced into the hydraulic reaction chamber 28 through the annular groove 4c around the inner periphery of the valve opening 4, the annular groove 5g around the outer periphery and the reaction passage 26.

In operation, the solenoid 10 operates to allow the rod 12 to project to the right, as viewed in FIG. 1, further for a lower vehicle speed, but causes the rod 12 to be displaced to the left as the vehicle speed increases. When turning the steering wheel during a stationary condition, the spool valve 6 moves to its rightmost position where the variable throttle 30 is closed, and the hydraulic branching from the oil pump 18 which is developed in accordance with the load upon the power steering system is not introduced into the hydraulic reaction chamber 28. Accordingly, the hydraulic pressure within the reaction chamber 28 remains substantially null for any increase in the hydraulic pressure from the pump, producing no hydraulic responsive reaction torque in performance.

As the vehicle speed increases, the spool valve 6 gradually becomes displaced to the left from the position which is assumed during the stationary condition, thus increasing the area of opening of the variable throttle 30 located adjacent the annular groove 6f while reducing the area of opening of the variable throttle 32 located adjacent the shank 6a, as shown in FIG. 1. Consequently, the pressure ratio (reaction pressure/P.S. pressure) of the pressurized oil which is introduced into the reaction chamber 28 increases as the vehicle speed increases. If the steering wheel is now operated to increase the pressure of the power steering system (P.S.) (or pump pressure), the hydraulic pressure within the reaction chamber 28 rises in accordance with an established pressure ratio, producing a hydraulic responsive reaction.

With a pressure rise of the power steering system (P.S.) during the steering operation, the pressure in the annular groove 4c around the inner periphery of the valve opening 4 begins to increase in accordance with the pressure ratio which is established before the steering operation (which means the condition assumed before the steering operation, and independent from the neutral condition). The spool valve 6 is then subject to the pressure prevailing in the annular groove 4c of the valve opening 4 with a pressure responsive area corresponding to an area differential between the different diameter lands 6d and 6b, and thus the spool valve 6 is driven to the right against the resilience of the spring 8, thus reducing the variable throttle 30 located adjacent the annular groove 6f and increasing the variable throttle 32 located adjacent the shank 6a to suppress the pressure within the annular groove 4c. A relationship which prevails between the supply or inlet pressure of the power steering system and the reaction or reaction pressure of the hydraulic reaction chamber is graphically illustrated by the characteristic shown in FIG. 2.

As a consequence, the pressure ratio with respect to the inlet pressure of the power steering system (P.S.) (or reaction pressure/P.S. pressure) becomes gradually reduced to suppress an increase in the steering torque, whereby a favorable control over the steering force which is other than a linearly proportional control is enabled.

Figure 2:
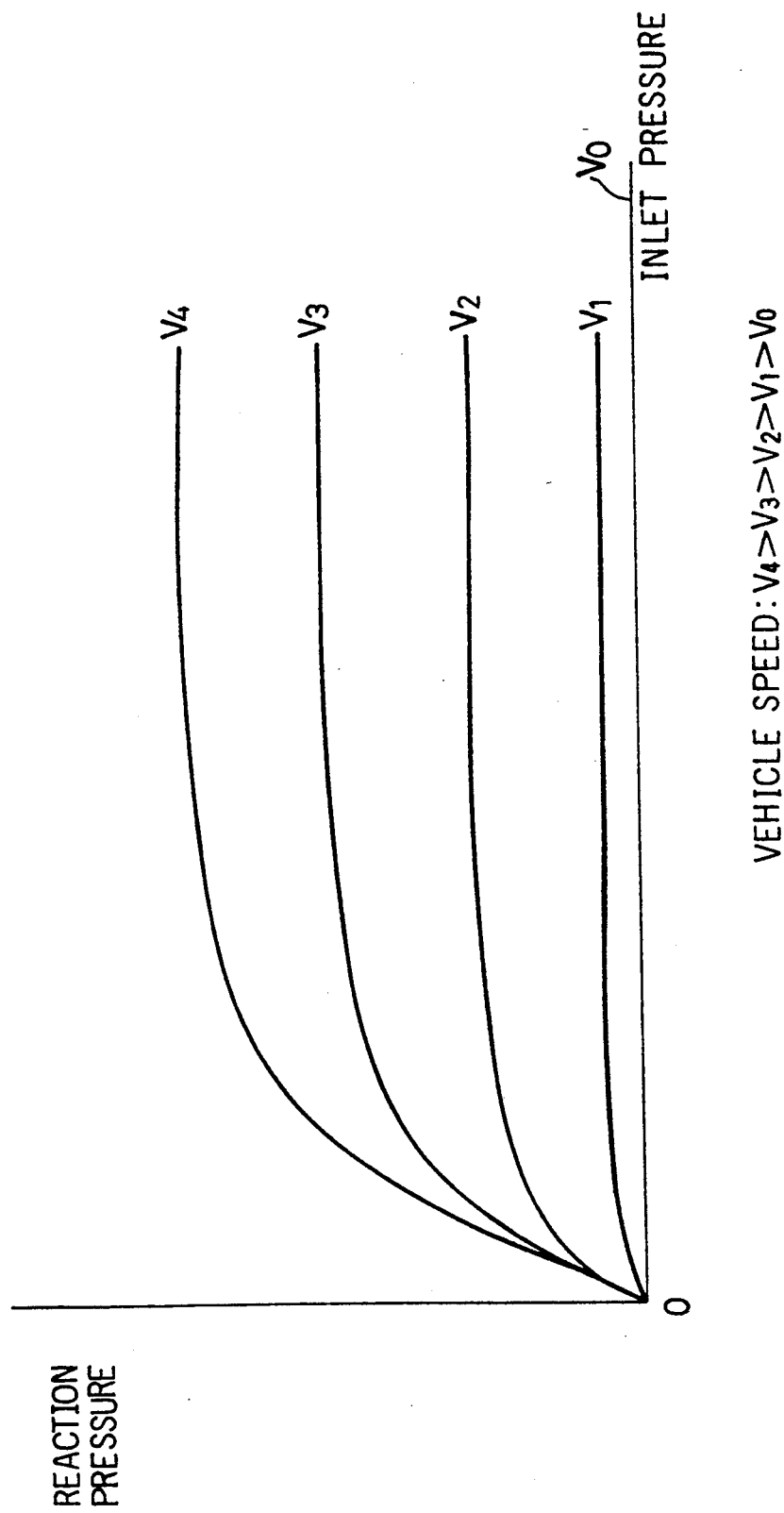
FIG. 2 graphically shows the characteristic of the control apparatus.

It should be understood that the characteristics illustrated in FIG. 2 are generally typical, but many other characteristics can be obtained by a combination of the configurations of the variable throttles 30 and 32, a variation of the difference in the diameters between the land 6b on the one hand and the lands 6d and 6e on the other hand, the characteristic of the spring 8 (resilience) and the operating response of the solenoid 10.

Figure 3:
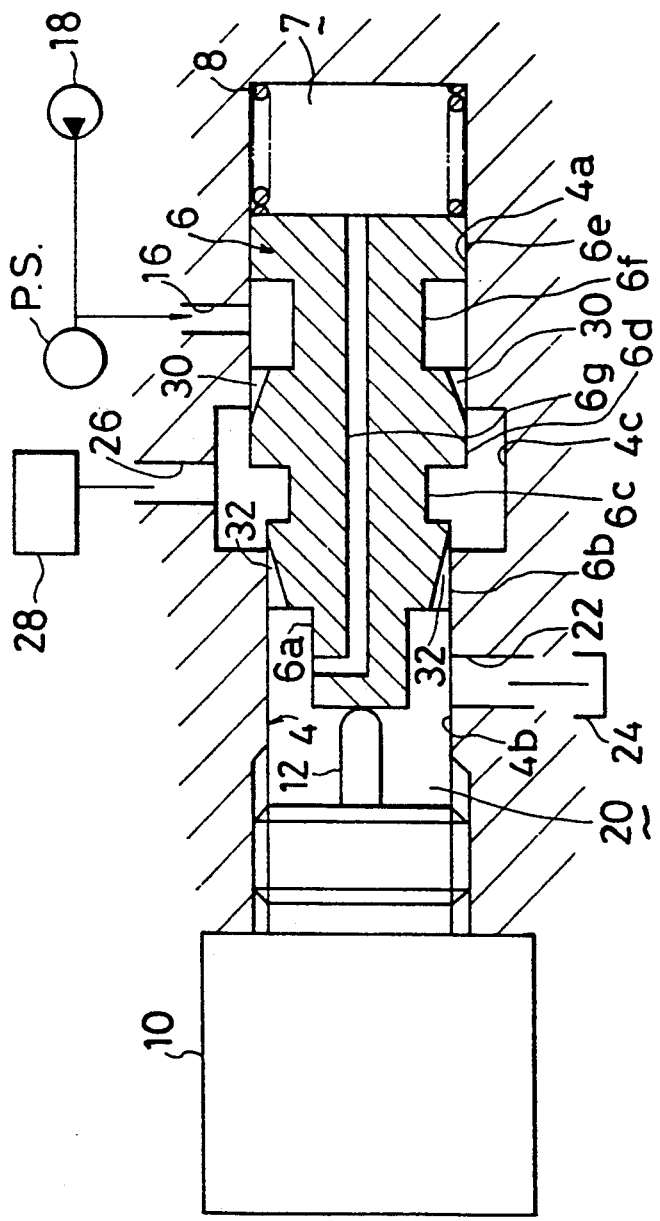
FIG. 3 is a longitudinal section of another embodiment of the invention when a vehicle is in a running condition.
Figure 4:
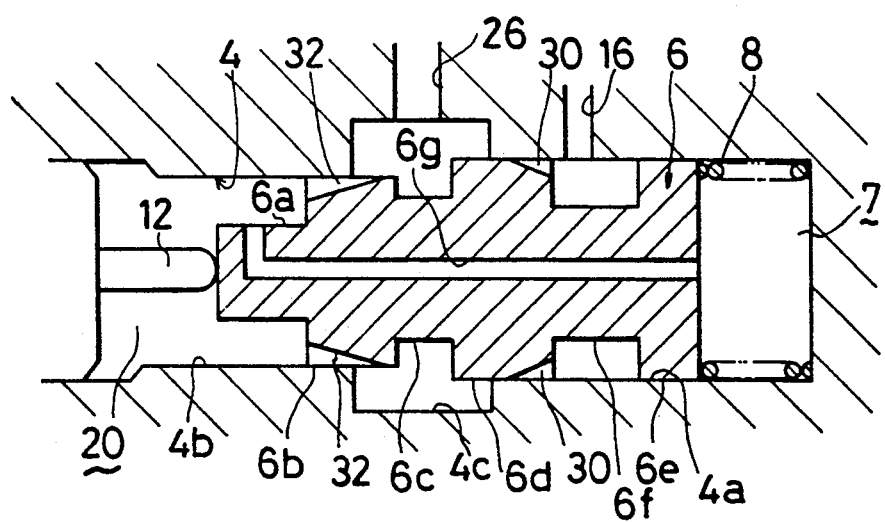
FIG. 4 illustrates a different phase (when a vehicle is in a stationary condition) of operation of the embodiment shown in FIG. 3.

Another embodiment of the invention is illustrated in FIGS. 3 and 4 where corresponding parts as those described above are designated by like reference numeral without repeating their description. In this embodiment, the housing 2 and the sleeve 5 are integrally constructed, and hence the axial position of the sleeve cannot be adjusted, but it should be understood that similar effects as those achieved in the described embodiment can be attained.

While the invention has been described above in connection with the several embodiments thereof, it should be understood that a number of changes, modifications and substitutions therein will readily occur to one skilled in the art from the above disclosure without departing from the spirit and scope of the invention defined by the appended claims.

What is claimed is:

1. In a steering force control apparatus for a power steering system wherein pressurized oil discharged from an oil pump is supplied to the power system and through a control valve into a hydraulic reaction chamber to produce a steering reaction, the improvement comprising said control valve including a housing having an internal valve opening therein with an annular groove which is connected in fluid circuit with the hydraulic reaction chamber, the annular groove having portions of different internal diameters on opposite sides thereof, a spool valve reciprocally received in said valve opening and having a large diameter portion and a small diameter portion being fitted into said valve opening, a resilient member engaged with one end of said spool valve while an other end thereof abuts against a reciprocable rod, a spacing between said portions of different internal diameters and said large and said small diameter portions of said spool valve associated therewith defining a pair of variable throttles each of which respectively enlarge and reduce in area as said spool valve reciprocates, the pressurized oil from the oil pump being introduced into the hydraulic reaction chamber through the variable throttle formed at the large diameter portions being returned to a tank through the variable throttle formed at the small diameter portions, said reciprocal rod being axially moved to cause said spool valve to be moved axially of said valve opening to thereby control a magnitude of oil pressure in the hydraulic reaction chamber, a difference in the oil pressure in the hydraulic reaction chamber being responsive to variations in the difference in said areas of said variable throttles, so that whenever the pressure in said annular groove becomes equal to or greater than a given value determined by the position of said reciprocal rod and thence said spool valve, said spool valve will move against an urging of said resilient member to suppress a pressure rise in the hydraulic reaction chamber.

2. The steering force control apparatus according to claim 1, wherein said housing includes a housing body, and a sleeve fitted in said housing body.

3. The steering force control apparatus according to claim 2, further comprising means for selectively positioning said sleeve within said housing body.

4. The steering force control apparatus according to claim 1, wherein said reciprocal rod is driven back and forth by a solenoid.

5. The steering force control apparatus according to claim 1, further comprising an oscillation suppressing throttle opening in an internal passage which provides a communication between the opposite ends of said spool valve.

6. In a steering force control apparatus for a power steering system having a reaction control means responsive to an input applied by a steering wheel for causing an introducing of a controlled amount of pressurized oil supplied from an oil pump to the power steering system, the improvement comprising said reaction control means including means defining a hydraulic reaction chamber receiving said pressurized oil therein and developed by a steering reaction, and a reaction pressure control valve for controlling the pressurized oil introduced into said hydraulic reaction chamber, said reaction pressure control valve having a housing with means defining an opening therein and a spool valve slidably fitted in said opening, a resilient member abutting against one end face of said spool valve, a reciprocal rod abutting against an other end face of said spool valve, means on said housing defining low pressure chambers adjacent each of the end faces of said spool valve and connected in fluid communication with a source of low pressure, means defining a supply passage opening into a sliding surface between said housing and said spool valve to and being connected in fluid circuit with the pressurized oil of the power steering system, means defining a peripheral groove opening into the sliding surface and communicating with the hydraulic reaction chamber, and means defining a discharge passage opening into the sliding surface and communicating with the source low pressure, said spool valve having means defining an annular passage communicating with the supply passage and a pair of lands disposed on opposite axial sides of said peripheral groove, one of said lands adjacent said supply passage having a greater diameter, an other of said lands adjacent said discharge passage having a smaller diameter, means defining a first variable throttle formed in said land having the greater diameter, and means defining a second variable throttle formed in said land having the smaller diameter, said first and second variable throttles being formed so that the area of opening of one decreases while the area of opening of the other increases in response to an axial displacement of said spool valve, said reciprocal rod exerting a thrust responsive to a vehicle speed to cause said spool valve to move against an urging of said resilient member, a reaction oil pressure produced in said peripheral groove, forming as a result of the introduction of the pressurized oil from the power steering system through said first throttle, being effective to cause said spool valve to move against the urging of said resilient member with a pressure responsive area defined by a difference in the area between the greater diameter land and the smaller diameter land of said spool valve.

* * * * *